US012567287B2

(12) United States Patent
Nishie

(10) Patent No.: US 12,567,287 B2
(45) Date of Patent: Mar. 3, 2026

(54) VEHICLE DATA COLLECTION DEVICE, VEHICLE DATA COLLECTION SYSTEM, AND VEHICLE DATA COLLECTION METHOD

(71) Applicant: DENSO CORPORATION, Kariya City (JP)

(72) Inventor: Keisuke Nishie, Kariya City (JP)

(73) Assignee: DENSO CORPORATION, Kariya City (JP)

( * ) Notice: Subject to any disclaimer, the term of this patent is extended or adjusted under 35 U.S.C. 154(b) by 215 days.

(21) Appl. No.: 18/160,328

(22) Filed: Jan. 27, 2023

(65) Prior Publication Data

US 2023/0260336 A1 Aug. 17, 2023

(30) Foreign Application Priority Data

Feb. 15, 2022 (JP) ................................ 2022-021193

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC ....... G07C 5/008; G07C 5/085; G07C 5/0841
USPC ........................................................ 701/33.4
See application file for complete search history.

(56) References Cited

U.S. PATENT DOCUMENTS

| | | | | |
|---|---|---|---|---|
| 11,403,895 | B2 * | 8/2022 | Lewis | G07C 5/0808 |
| 2012/0315949 | A1 | 12/2012 | Zhang et al. | |
| 2016/0057561 | A1 * | 2/2016 | Kami | H04W 68/005 370/329 |
| 2017/0255966 | A1 * | 9/2017 | Khoury | B60W 40/00 |
| 2018/0035321 | A1 | 2/2018 | Zhang et al. | |
| 2018/0279085 | A1 | 9/2018 | Himura et al. | |
| 2020/0336541 | A1 * | 10/2020 | Naderi Alizadeh | G05D 1/0088 |
| 2021/0107501 | A1 * | 4/2021 | Monteil | A61B 5/6893 |
| 2022/0012561 | A1 | 1/2022 | Yamaguchi | |

(Continued)

FOREIGN PATENT DOCUMENTS

| | | | |
|---|---|---|---|
| JP | H11-083531 | A | 3/1999 |
| JP | 2007-170898 | A | 7/2007 |
| JP | 2009-129074 | A | 6/2009 |

(Continued)

*Primary Examiner* — Tyler D Paige
(74) *Attorney, Agent, or Firm* — Harness, Dickey & Pierce, P.L.C.

(57) ABSTRACT

A data collector collects types of vehicle data. An analysis model represents a correspondence between a tendency and a purposes of use of a vehicle. In a correspondence table, selected data, which is a part of the types of vehicle data to be collected for each of the purposes of use, is associated with the purpose of use. A data accumulator accumulates the types of vehicle data collected in a certain period in the past. A purpose discriminator discriminates the purpose of use using the analysis model and the types of vehicle data accumulated in the data accumulator. A storage controller causes a transmission data storage to store the selected data to be transmitted to a center device identified using the correspondence table and based on the discriminated purpose of use. A transmission controller transmits the stored selected data to the center device at a set transmission frequency.

15 Claims, 10 Drawing Sheets

(56) References Cited

U.S. PATENT DOCUMENTS

| | | | | |
|---|---|---|---|---|
| 2023/0260336 | A1* | 8/2023 | Nishie | G07C 5/085<br>701/33.4 |
| 2023/0421732 | A1* | 12/2023 | Tal | G08G 1/0141 |

FOREIGN PATENT DOCUMENTS

| | | | |
|---|---|---|---|
| JP | 6342376 | B2 | 6/2018 |
| JP | 2018136754 | A | 8/2018 |
| JP | 6640769 | B2 | 2/2020 |
| JP | 2020-101960 | A | 7/2020 |
| JP | 6843662 | B2 | 3/2021 |

* cited by examiner

FIG. 2

[COLLECTION/TRANSMISSION TABLE]

| PURPOSE OF USE | | | DATA TYPE | COLLECTION FREQUENCY | | LATEST COLLECTION DATE AND TIME |
|---|---|---|---|---|---|---|
| | | | | STEADY STATE | UNSTEADY STATE | |
| COMMERCIAL USE | CARGO TRANSPORTATION | LONG-DISTANCE TRANSPORTATION | DATA A | ONCE A WEEK | ONCE A DAY | 2021-11-05 T19:50:30.257+0900 |
| | | | DATA B | ... | ... | ... |
| | | | ... | ... | ... | ... |
| | | HOME DELIVERY | ... | ... | ... | ... |
| | | ⋮ | ⋮ | ⋮ | ⋮ | ⋮ |
| | PASSENGER TRANSPORTATION | TAXI | ... | ... | ... | ... |
| | | HIRED CAR | ... | ... | ... | ... |
| | | ⋮ | ⋮ | ⋮ | ⋮ | ⋮ |
| | OTHER | RENTAL CAR/ SHARE CAR | ... | ... | ... | ... |
| | | ⋮ | ⋮ | ⋮ | ⋮ | ⋮ |
| PRIVATE USE | COMMUTING/SCHOOLING | | ... | ... | ... | ... |
| | LEISURE | | ... | ... | ... | ... |
| | SHOPPING | | ... | ... | ... | ... |
| | ⋮ | | ⋮ | ⋮ | ⋮ | ⋮ |

FIG. 3

[TRANSMIT DATA]

| DATA TYPE | DATA VALUE | PURPOSE OF USE WHEN STORED | STATE WHEN STORED | LATEST COLLECTION DATE AND TIME | TRANSMISSION FLAG |
|---|---|---|---|---|---|
| DATA A | ··· | PRIVATE USE OR COMMUTING/ SCHOOLING | STEADY STATE | 2021-11-05 T19:50:00.257+0900 | TRANSMITTED |
| DATA B | ··· | ··· | UNSTEADY STATE | ··· | UNTRANSMITTED |
| ⋮ | ⋮ | ⋮ | ⋮ | ⋮ | ⋮ |

VEHICLE DATA COLLECTION DEVICE, VEHICLE DATA COLLECTION SYSTEM, AND VEHICLE DATA COLLECTION METHOD

CROSS REFERENCE TO RELATED APPLICATION

The present application claims the benefit of priority from Japanese Patent Application No. 2022-021193 filed on Feb. 15, 2022. The entire disclosures of all of the above applications are incorporated herein by reference.

TECHNICAL FIELD

The present disclosure relates to a vehicle data collection device, a vehicle data collection system, and a vehicle data collection method.

BACKGROUND

A known vehicle data collection system collects vehicle data collected by a connected car, which is connected to a communication network.

SUMMARY

According to an aspect of the present disclosure, a vehicle data collection device is configured to collect vehicle data and transmit the vehicle data to a center device.

BRIEF DESCRIPTION OF THE DRAWINGS

The above and other objects, features and advantages of the present disclosure will become more apparent from the following detailed description made with reference to the accompanying drawings. In the drawings:

FIG. 2 is an explanatory diagram illustrating contents of a collection/transmission table;

FIG. 3 is an explanatory diagram exemplifying contents of selected data stored in a transmission data storage unit;

DETAILED DESCRIPTION

Figure 1:
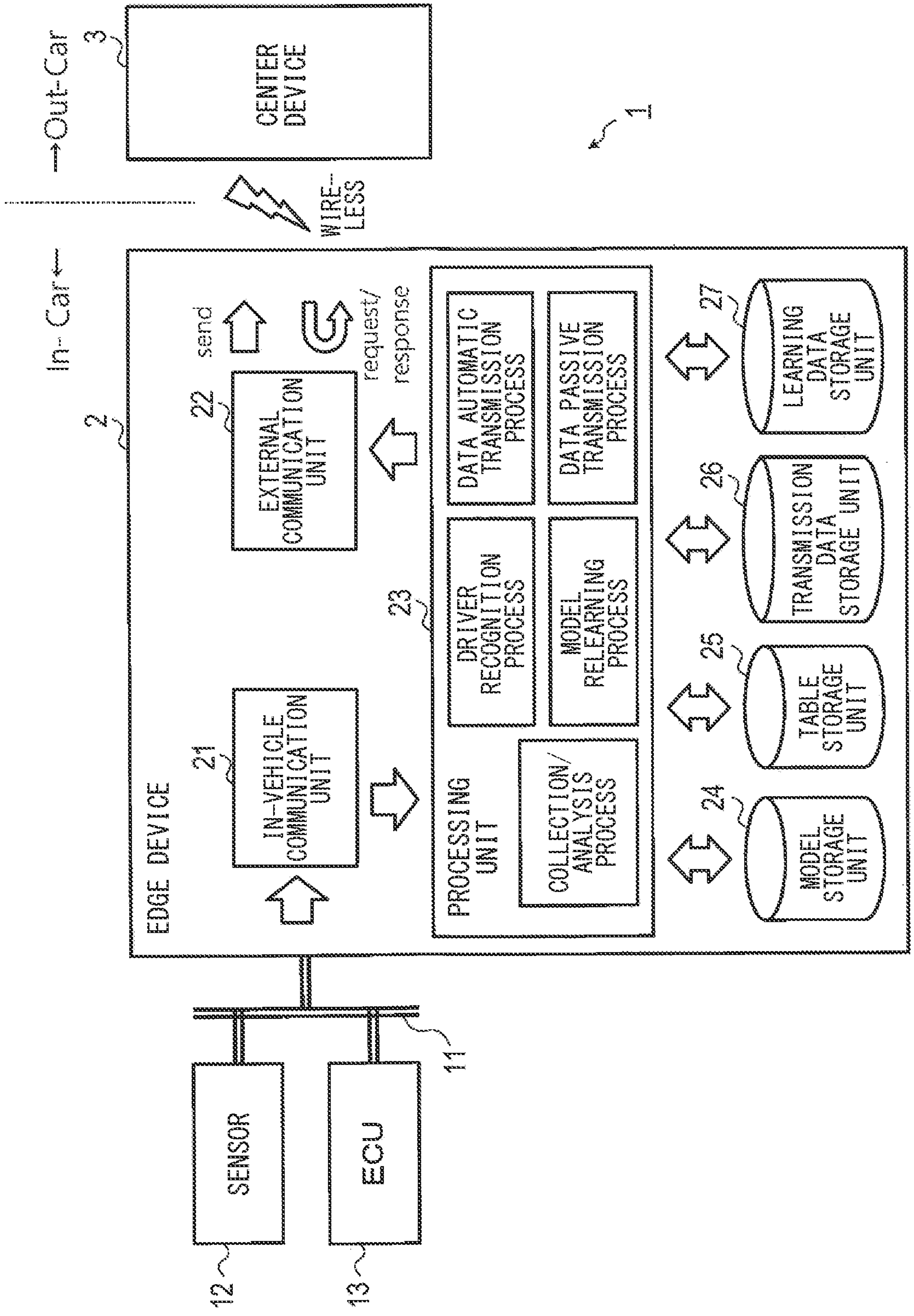
FIG. 1 is a block diagram illustrating a vehicle data collection system.

Embodiments of the present disclosure will be described below with reference to the drawings.

According to an aspect of the present disclosure, a vehicle data collection system collects vehicle data collected by a connected car, which is connected to a communication network. The vehicle data collection system accumulates the vehicle data in a center device to be used for provision of services, data analysis, and the like.

According to an aspect of the present disclosure, a configuration is employed to appropriately delete vehicle data, which is not necessary for provision of services, among vehicle data accumulated in the center device, according to a service provided by the center device, thereby to reduce data maintenance and management cost in the center device.

In this configuration, unnecessary vehicle data, which is to be deleted in the center device, is transmitted from a vehicle, and the vehicle data is held by the vehicle for the transmission. In other words, there is a concern that a vehicle resource such as a memory and electric power are wasted for transmission of the unnecessary vehicle data.

According to an example of the present disclosure, a vehicle data collection device comprises: a data collector; a model storage; a table storage; a transmission data storage; a data accumulator; a purpose discriminator; a storage controller; and a transmission controller.

The data collector is configured to collect a plurality of types of vehicle data representing at least one of a state of a vehicle or a behavior of the vehicle. The model storage is configured to store an analysis model representing a correspondence between a tendency, which is shown by a time series of the plurality of types of vehicle data, and a plurality of purposes of use each representing a purpose for which a driver of the vehicle uses the vehicle. The table storage is configured to store a correspondence table in which selected data, which is a part of the plurality of types of vehicle data to be collected for each of the purposes of use, is associated with the purpose of use. The transmission data storage is configured to store the selected data to be transmitted to a center device that is configured to accumulate data. The data accumulator is configured to accumulate the plurality of types of vehicle data collected by the data collector in a certain period of time in the past. The purpose discriminator is configured to discriminate the purpose of use of the vehicle using the analysis model that is stored in the model storage and a discrimination data group that is the plurality of types of vehicle data accumulated in the data accumulator. The storage controller is configured to store, in the transmission data storage, the selected data identified using the correspondence table and based on the purpose of use discriminated by the purpose discriminator. The transmission controller is configured to transmit the selected data, which is stored in the transmission data storage, to the center device at a set transmission frequency.

According to the configuration, an amount of data transmitted from the vehicle data collection device to the center device is reduced, and therefore, necessary data can be efficiently transmitted. In addition, an amount of power consumed by the vehicle data collection device to transmit the data can be reduced. Therefore, the configuration enables to improve fuel consumption of the vehicle equipped with the vehicle data collection device. Furthermore, both the vehicle data collection device and the center device are enabled to reduce a capacity of the memory for holding the data to be transmitted and received and to reduce a cost for holding the data.

According to an example of the present disclosure, a vehicle data collection system comprises a vehicle data collection device and a center device. The vehicle data collection device is mounted on a vehicle. The center device is configured to communicate with the vehicle data collection device.

The vehicle data collection device is the same as the vehicle data collection device described above as an example of the present disclosure. The center device is configured to accumulate the selected data, which is transmitted from the vehicle data collection device, for analysis or for providing a mobility service.

According to an example of the present disclosure, a vehicle data collection method comprises: collecting a plurality of types of vehicle data representing at least one of a state of a vehicle or a behavior of a vehicle; determining the purpose of use of the vehicle using an analysis model and a discrimination data group, the analysis model representing a correspondence between a tendency, which is shown by a time series of the plurality of types of vehicle data, and a plurality of purposes of use representing purposes for which a driver of the vehicle uses the vehicle, the discrimination data group being the plurality of types of vehicle data collected in a certain period of time in the past; storing, using a correspondence table in which each of the purposes of use is associated with selected data, which is a part of the plurality of types of vehicle data to be collected for the purpose of use, the selected data identified from the discriminated purpose of use; and transmitting the stored selected data to a center device that is configured to accumulate the selected data at a set collection frequency.

The vehicle data collection system and the vehicle data collection method of the present disclosure enables to produce effects similar to those produced by the vehicle data collection device.

1. Overall Configuration

A vehicle data collection system 1 shown in FIG. 1 includes an edge device 2 and a center device 3.

The edge device 2 is mounted on a vehicle and configured to be communicable with the center device 3. Hereinafter, the vehicle equipped with the edge device 2 is referred to as an edge-equipped vehicle. The edge device 2 has a function of collecting vehicle data of the edge-equipped vehicle and uploading the collected vehicle data to the center device 3. The edge-equipped vehicle is also referred to as a connected car.

The center device 3 is configured to be communicable with the edge device 2. The center device 3 has a function of accumulating the vehicle data uploaded from the edge device 2 in a database and executing data analysis as necessary. The center device 3 may have a function of generating an analysis model used for determining a purpose of use of the vehicle from the vehicle data and distributing the analysis model to the edge device 2. The center device 3 may have a function of providing various mobility services such as controlling the edge-equipped vehicle using the vehicle data accumulated in the database. The center device 3 may be a cloud server.

2. Edge Device

[2-1. Hardware Configuration]

The edge device 2 includes an in-vehicle communication unit 21, an external communication unit 22, a processing unit 23, a model storage unit 24, a table storage unit 25, a transmission data storage unit 26, and a learning data storage unit 27.

The in-vehicle communication unit 21 acquires vehicle data from various in-vehicle devices such as a sensor 12 and an electronic control unit (hereinafter referred to as an ECU) 13 via an in-vehicle local area network (hereinafter referred to as an in-vehicle LAN) 11 of the edge-equipped vehicle. The in-vehicle LAN 11 may include a controller area network (hereinafter referred to as CAN) and Ethernet. Both CAN and Ethernet are registered trademarks.

The vehicle data may include information representing a content of vehicle operation by a driver, information representing a behavior of the vehicle, an operating status of the in-vehicle device, image information representing a status inside and outside the vehicle, information obtained by process image information, and the like.

The external communication unit 22 communicates with the center device 3 by wireless communications. The communications with the center device 3 may be performed via a wide area communication network.

The processing unit 23 includes a CPU and a memory such as ROM and RAM. Various functions of the processing unit 23 are implemented by the CPU executing a program stored in a non-transitory tangible storage medium (non-transitory computer-readable storage medium. In this example, the memory corresponds to a non-transitory tangible storage medium for storing a program. By executing the program, a method corresponding to the program is executed.

The processing unit 23 executes a collection/analysis process and a data automatic transmission process. The processing unit 23 may further execute a driver recognition process, a model relearning process, and a data passive transmission process. Details of these processes will be described later.

The model storage unit 24 stores the analysis model. The analysis model is used in the collection/analysis process when discrimination of the purpose of use of the vehicle from the vehicle data is performed. For example, the analysis model is downloaded from the center device 3 or the like. As for the analysis model, a dedicated analysis model for each driver to be recognized in the driver recognition process and a general analysis model regardless of a driver may be prepared.

The analysis model is generated by clustering vehicle data acquired from various vehicles for different purpose of use. Each cluster generated by the clustering is associated with a different purpose of use.

As for the purpose of use discriminated by using the analysis model, for example, as shown in FIG. 2, "commercial use" and "private use" may be provided as a large classification. In the case where the large classification is "commercial use", minor classifications such as "cargo transportation", "passenger transportation", and "others" may be provided. In the case where a middle classification is "cargo transportation", small classifications such as "long distance transportation" and "home delivery" may be provided. In the case where the middle classification is "passenger transportation", small classifications such as "taxi" and "hired car" may be provided. In the case where the middle classification is "others", a small classification such as "rental car/share car" may be provided.

In the case where the large classification is "private use", small classifications such as "commuting/schooling", "leisure", and "shopping" may be provided.

The method of classification is not limited to the one described above. Similar clusters may be integrated with one another, a large-sized cluster may be further subdivided, or classification may be performed from a viewpoint different from that described above.

The discrimination of the purpose of use uses, for example, a distance between a cluster formed by vehicle data to be discriminated (hereinafter referred to as a data cluster) and multiple clusters included in the analysis model (hereinafter referred to as a model cluster). Specifically, when the position of the data cluster is within a boundary of a predetermined range with respect to one of the model clusters or when the position of the data cluster is within a predetermined distance outside the boundary, it is defined as "discrimination success". Otherwise, it is defined as "discrimination failure". The position of the data cluster may be a central position of the cluster or a barycentric position. The predetermined range with respect to the model cluster may be within a predetermined distance outside the boundary of the model cluster, or may be within a predetermined distance from the center position or the barycentric position of the model cluster. A parameter used to discriminate the purpose of use is not limited to the distance between the clusters, and may be a magnitude of overlap between cluster ranges.

When the discrimination of the purpose of use is in success, the analysis model is used for, in addition to discrimination of the purpose of use, discrimination of a state of use for the purpose of use as discriminated. In the discrimination of the state of use, when the position of the data cluster is within a range of the model cluster, it is defined as "steady". When the position of the data cluster is outside the model cluster, it is defined as "unsteady".

Information relating to collection and transmission of the vehicle data is set in the table storage unit 25. As shown in FIG. 2, a collection/transmission table is set for each small classification of the purpose of use. The collection/transmission table may include items such as "data type", "collection frequency", and "latest collection date and time". Hereinafter, one purpose of use to which attention is paid is referred to as a purpose of interest. In the table of FIG. 2, which data is uploaded at what frequency is specifically defined for each purpose of use. Instead of such a specific definition, as a "collection/transmission policy", a "rule of which data should be collected/transmitted at what frequency" may be defined for the purpose of use.

The "data type" item lists one or more vehicle data to be collected when the vehicle is used for the purpose of interest.

The "collection frequency" and "latest collection date and time" are set for each vehicle data listed in the "data type" item. Hereinafter, one vehicle data to which attention is paid is referred to as data of interest.

The item "collection frequency" indicates a frequency of collecting the data of interest. For example, various settings such as once a week, once a day, every 6 hours, every hour, and every minute are possible.

The "collection frequency" may be set differently depending on whether the state of use is "steady state" or "unsteady state". Normally, the frequency is set to be higher in the "unsteady state" than in the "steady state". It is noted that, depending on the type of the vehicle data, the frequency may be set to be the same regardless of the state of use, or the frequency may be set to be higher in the "steady state" than in the "unsteady state" contrary.

The "latest collection date and time" is set to a date and time when the data of interest was last collected, that is, a date and time when the data of interest was stored in the transmission data storage unit 26.

The transmission data storage unit 26 temporarily stores the vehicle data, which is collected, according to the collection/transmission table for transmission to the center device 3.

As shown in FIG. 3, the vehicle data stored in the transmission data storage unit 26 are discriminated based on "data type". The "data value", "purpose of use when stored", "state when stored", "latest collection date and time", and "transmission flag" are stored for each data type.

The "data value" is a value of the data of interest. The "data value" may be single data or time-series data.

The "purpose of use when stored" stores the discrimination result of the purpose of use of the vehicle using the analysis model.

The "state of use when stored" stores the discrimination result of the state of use of the vehicle using the analysis model.

The "latest collection date and time" stores the date and time when the data of interest is updated.

The "transmission flag" indicates whether the data of interest has been transmitted to the center device 3 or untransmitted. The 'transmission flag' is set to 'untransmitted' when a new 'data value' is written, and is set to 'transmitted' when the transmission of the 'data value' is completed. The data of interest for which the "transmission flag" is set to "transmitted" may be deleted from the transmission data storage unit 26.

3. Processes

The driver identification process, the collection/analysis process, the model relearning process, the data automatic transmission process, and the data passive transmission process executed by the processing unit 23 will be described.

[3-1. Driver Identification Process]

The driver identification process is configured, for example, to acquire image information from a camera that captures the driver via the in-vehicle communication unit 21 and to identify the driver by process the acquired image information. Further, the driver identification process may be configured, for example, to acquire information input from the driver via the in-vehicle communication unit 21 and to identify the driver based on the acquired input information. Further, the driver identification process may be configured to acquire the vehicle data during a certain period of time from start of driving via the in-vehicle communication unit 21 and to identify the driver based on the acquired vehicle data.

[3-2. Collection/Analysis Process]

Figure 4:
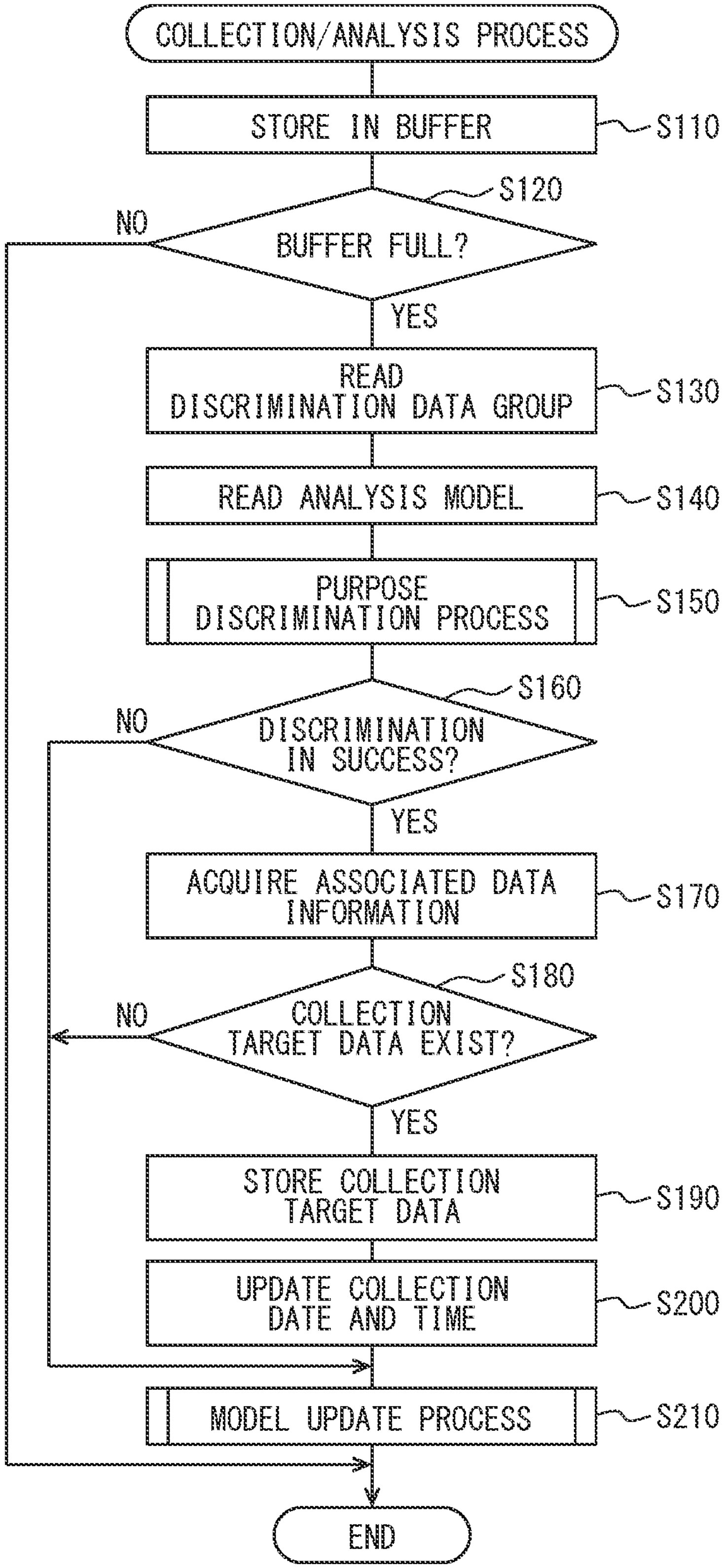
FIG. 4 is a flowchart showing a collection/analysis process.

The collection/analysis process executed by the processing unit 23 will be described with reference to the flowchart of FIG. 4. The collection/analysis process is repeatedly executed at a constant cycle when the edge device 2 is activated, for example, by turning on an ignition of the edge-equipped vehicle.

In S110, the processing unit 23 stores the vehicle data acquired via the in-vehicle communication unit 21 in a ring buffer. The ring buffer is configured to accumulate a certain number of vehicle data that can ensure an accuracy of discrimination required in the purpose discrimination process, which will be described later, that is, the vehicle data for a most recent fixed period determined by (fixed cycle times)×(fixed number).

In subsequent S120, the processing unit 23 determines whether or not the ring buffer is full. When the processing unit 23 determines that the ring buffer is full, the process proceeds to S130. When the processing unit 23 determines that the ring buffer has a space, the process ends. That is, until the ring buffer becomes full after the edge device 2 is activated, that is, until the required determination accuracy in the purpose discrimination process can be secured, the processes from S130 to S210 described below are canceled.

In S130, the processing unit 23 reads the data accumulated in the ring buffer, as a discrimination data group.

In subsequent S140, the processing unit 23 reads the analysis model from the model storage unit 24. At this time, when the driver has been recognized by the driver recognition process that is executed separately, the analysis model dedicated to the recognized driver is read according to the recognition result. When the driver has not been recognized, a general analysis model is read.

In subsequent S150, the processing unit 23 executes the purpose discrimination process for discriminating the purpose of use and the state of use of the edge-equipped vehicle using the analysis model based on the discrimination data group, which is read in S130.

In subsequent S160, the processing unit 23 determines whether or not the purpose of use of the edge-equipped vehicle has been successfully discriminated based on the discrimination result of the purpose discrimination process in S150. When the discrimination is in success, the process proceeds to S170. When the discrimination is in failure, the process proceeds to S210.

In S170, the processing unit 23 refers to the collection/transmission table stored in the table storage unit 25 using the determination result of the purpose discrimination process, thereby to acquire information on the vehicle data (hereinafter referred to as selected data) associated with the discriminated purpose of use.

In subsequent S180, the processing unit 23 determines whether or not there is the selected data to be collected at the current timing (hereinafter referred to as collection target data) based on the information on the selected data acquired in S170. The processing unit 23 proceeds the process to S190 when the collection target data exists, and proceeds the process to S210 when the collection target data does not exist.

In S190, the processing unit 23 stores the collection target data in the transmission data storage unit 26, as transmission data. At this time, as shown in FIG. 3, the processing unit 23 updates the data values of the collection target data, as well as the "purpose of use" and the "state of use", as well as the "data update date and time", which are the discrimination results of the purpose discrimination process, and further sets the "transmission flag" is to untransmitted.

In S200, the processing unit 23 updates the "data update date and time" of the item associated with the collection target data in the table storage unit 25.

In subsequent S210, the processing unit 23 executes the model update process for updating the analysis model using the discrimination data group, and ends the process.

[3-2-1. Purpose Discrimination Process]

Figure 5:
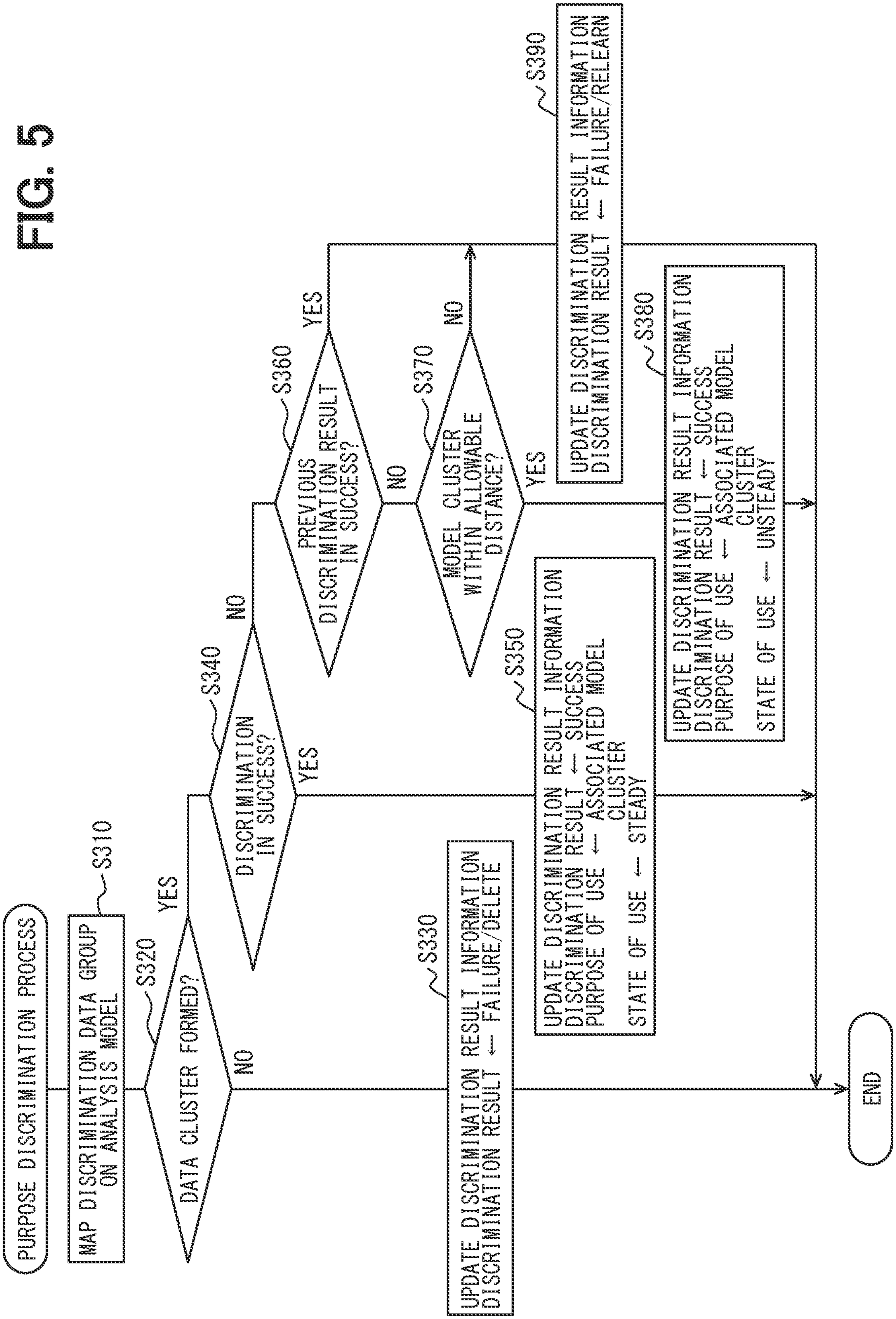
FIG. 5 is a flowchart showing a purpose discrimination process.

The purpose discrimination process executed by the processing unit 23 in S150 will be described with reference to the flowchart of FIG. 5.

When the purpose discrimination process is started, in S310, the processing unit 23 maps the discrimination data group read in S130 on the analysis model read in S140.

In subsequent S320, the processing unit 23 determines whether or not the mapped discrimination data group forms a data cluster. The processing unit 23 proceeds the process to S340, when determining that the discrimination data group forms a data cluster. The processing unit 23 proceeds the process to S330, when determining that the discrimination data group does not form a data cluster and determining that the discrimination data group as a noise. For determining whether or not the discrimination data group forms the data cluster, a magnitude of and a variation in the distance between vehicle data belonging to the discrimination data group, or the like may be used.

In S330, the processing unit 23 updates the discrimination result information representing the discrimination result in the purpose discrimination process as follows, and ends the process. The discrimination result information includes the "discrimination result", the "purpose of use", and the "state of use". That is, the processing unit 23 updates the "discrimination result" to failure, and retains the current values of the "purpose of use" and "state of use". When the "discrimination result" is in failure, in a mode of failure, 'delete' for deleting the data used for the discrimination and 'relearn' for relearning the data used for the discrimination exist. Hereinafter, a case where the "discrimination result" is failure and the mode of failure is delete is represented by 'failure/delete', and a case where the "discrimination result" is failure and the mode of failure is relearn is represented by 'failure/relearn'.

In S340, the processing unit 23 determines whether or not the purpose of use of the edge-equipped vehicle has been successfully determined using the analysis model. Specifically, for example, when the position of the data cluster belongs to any one of the clusters forming the analysis model (hereinafter referred to as model cluster), it is determined that the determination has succeeded. The position of the data cluster may be, for example, the center of the data cluster or the barycentric position.

The processing unit 23 proceeds the process to S350 when determining that the determination of the purpose of use has succeeded, and proceeds the process to S360 when determining that the determination of the purpose of use has failed.

In S350, the processing unit 23 updates the determination result information of the purpose discrimination process as follows, and ends the process. That is, the processing unit 23 updates the "determination result" to success, updates the "purpose of use" to the purpose of use associated with the model cluster including the position of the data cluster, and constantly updates the "state of use".

In S360, the processing unit 23 determines whether or not the "determination result" in the purpose discrimination process in the previous process cycle is in success. The processing unit 23 proceeds the process to S390 on determination of success, and proceeds the process to S370 on determination of failure.

In S370, the processing unit 23 determines whether or not the model cluster exists within the allowable distance from the position of the data cluster on the analysis model. When the model cluster exists, the processing unit 23 proceeds the process to S380, and when the model cluster does not exist, the processing unit 23 proceeds the process to S390. It should be noted that the distance to the boundary of the model cluster may be used to determine whether or not it is within the allowable distance, or the distance to the center of the model cluster or the barycentric position of the model cluster may be used.

In S380, the processing unit 23 updates the determination result information of the purpose discrimination process as follows, and ends the process. That is, the processing unit 23 updates the "purpose of use" to the purpose associated with the model class existing within the allowable distance from the position of the data cluster, and "state of use" is updated to the unsteady state.

In S390, the processing unit 23 updates the determination result information as follows and ends the process. That is, the processing unit 23 updates the "determination result" to the failure/relearn.

Figure 6:
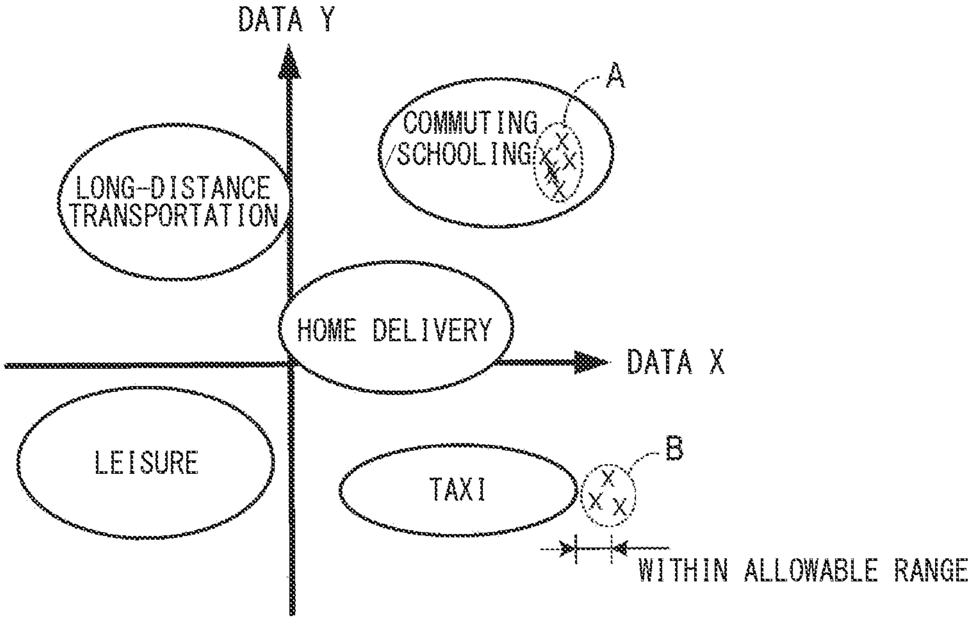
FIG. 6 is an explanatory diagram showing an example of success in discrimination using an analysis model.
Figure 7:
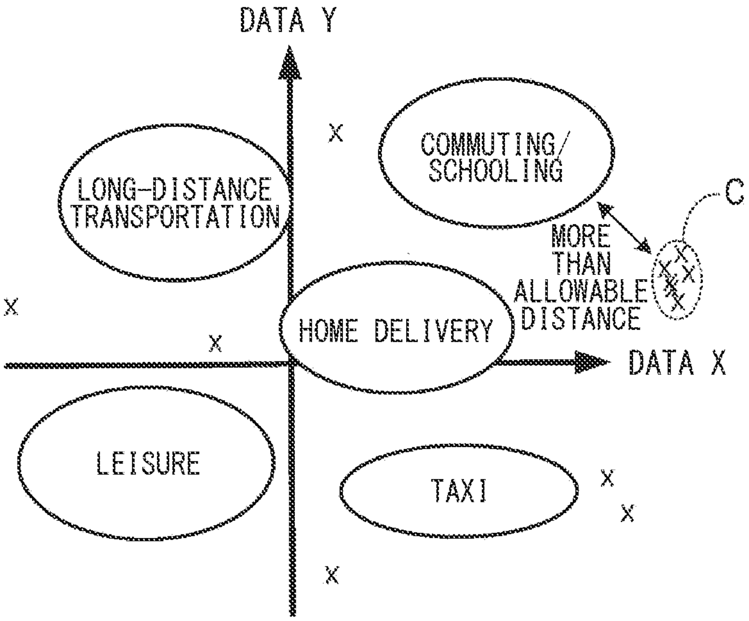
FIG. 7 is an explanatory diagram showing an example of failure in discrimination using the analysis model.

The determination result of the purpose discrimination process will be exemplified with reference to FIGS. 6 and 7.

In FIGS. 6 and 7, the vehicle data belonging to the discrimination data group are indicated by x, and the data clusters formed by the discrimination data group are indicated by A to C. In FIGS. 6 and 7, the vehicle data are expressed as points on the two-dimensional graph for convenience. It is noted that, the vehicle data are actually represented as points on a multidimensional graph corresponding to the number of the vehicle data belonging to the discrimination data group. When the discrimination data group forms a data cluster A, in the discrimination result information in the purpose discrimination process, the "discrimination result" is the successful, the "purpose of use" is the commuting/schooling, and the "state of use" is the steady state. When the discrimination data group forms a data cluster B whose distance from the model cluster is within the allowable distance, the "discrimination result" is the successful, the "purpose of use" is a taxi, and the "state of use" is the unsteady state. When the discrimination data group forms a data cluster C whose distance from the model cluster is greater than the allowable distance, the "discrimination result" is the failure/relearn, and the "purpose of use" and "state of use" are invalid. As shown in FIG. 7 except the data cluster C, when the vehicle data belonging to the discrimination data group does not form the data cluster, the vehicle data belonging to the discrimination data group is regarded as a noise, the "discrimination result" is failure/delete, and the "purpose of use" and the "state of use" are held at the previous values.

[3-2-2. Model Update Process]

Figure 8:
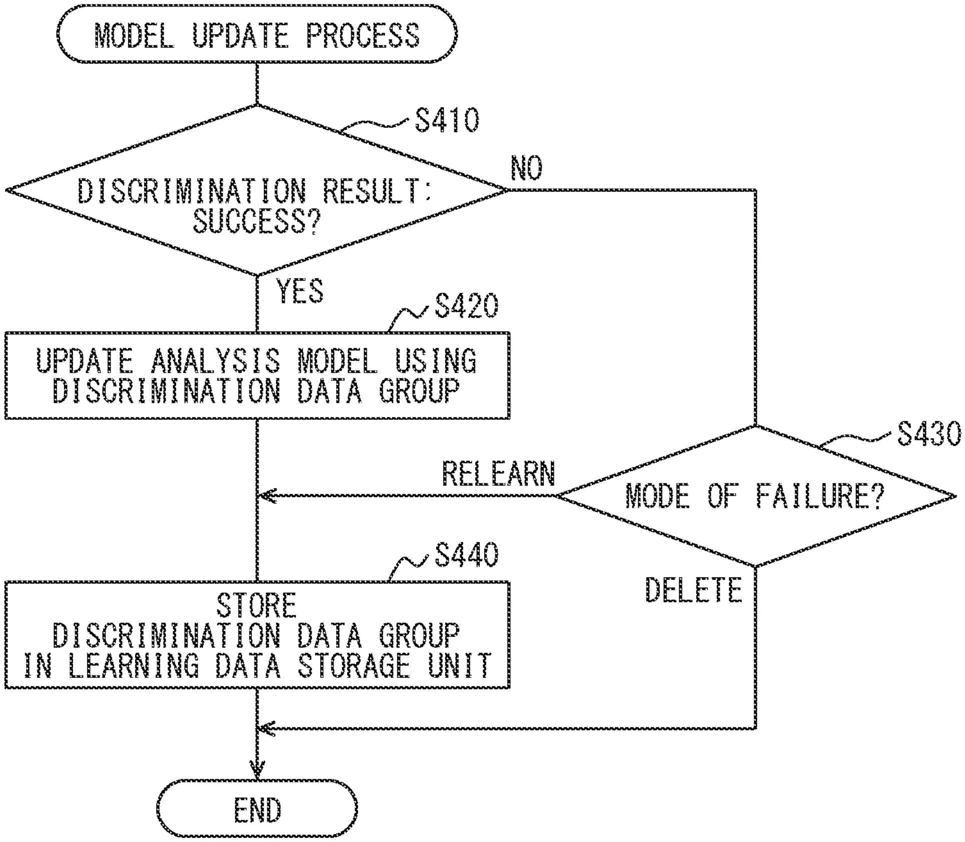
FIG. 8 is a flowchart of a model update process.

The model update process executed by the processing unit 23 in S210 will be described with reference to the flowchart of FIG. 8.

When the model update process is started, in S410, the processing unit 23 determines whether or not the determination result in the application discrimination process is in success. When the discrimination result is in success, the process proceeds to S420. When the discrimination result is in failure, the process proceeds to S430.

In S420, the processing unit 23 updates the analysis model using the discrimination data group, and proceeds the process to S440. Specifically, the analysis model is finely adjusted by adding the vehicle data belonging to the discrimination data group to the range of the model cluster associated with the determined "purpose of use" to recompute the range of the model cluster.

In S430, the processing unit 23 proceeds the process to S440 when the mode of failure in discrimination is the relearn, and ends the process when the mode of failure in discrimination is the delete.

In S440, the processing unit 23 causes the learning data storage unit 27 to store the vehicle data belonging to the discrimination data group, and ends the process.

Figure 9:
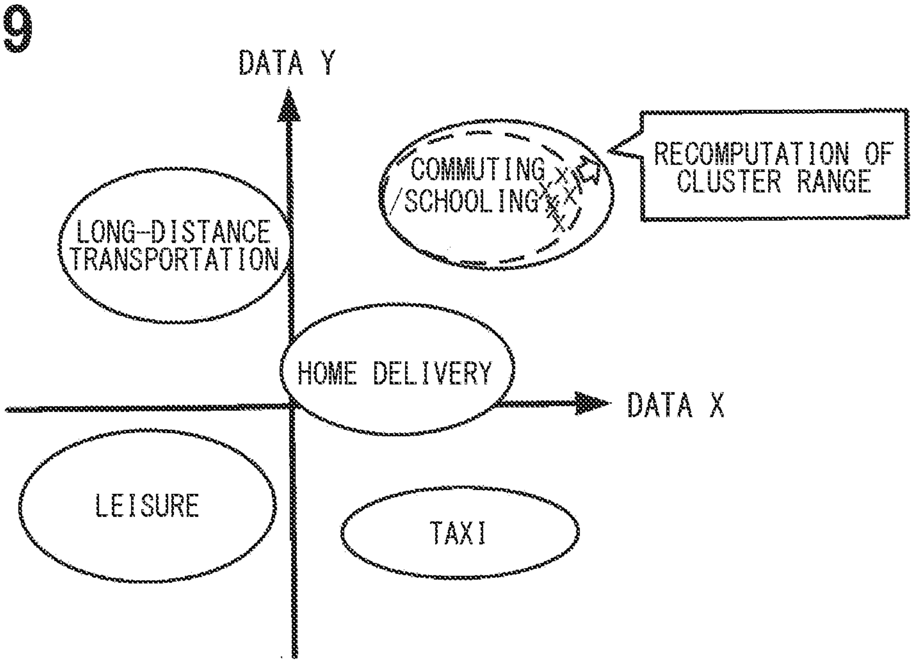
FIG. 9 is an explanatory diagram showing fine adjustment of the analysis model.

For example, as shown in FIG. 9, when the discrimination data group exists in a position deviated from the center within the range of the model cluster, the range of the recomputed model cluster spreads or shifts in a deviated direction in which the discriminating data group exists. In FIG. 9, the model cluster associated with the commuting/schooling is indicated by a dotted line before the learning and is indicated by a solid line after the learning.

[3-3. Model Relearning Process]

Figure 10:
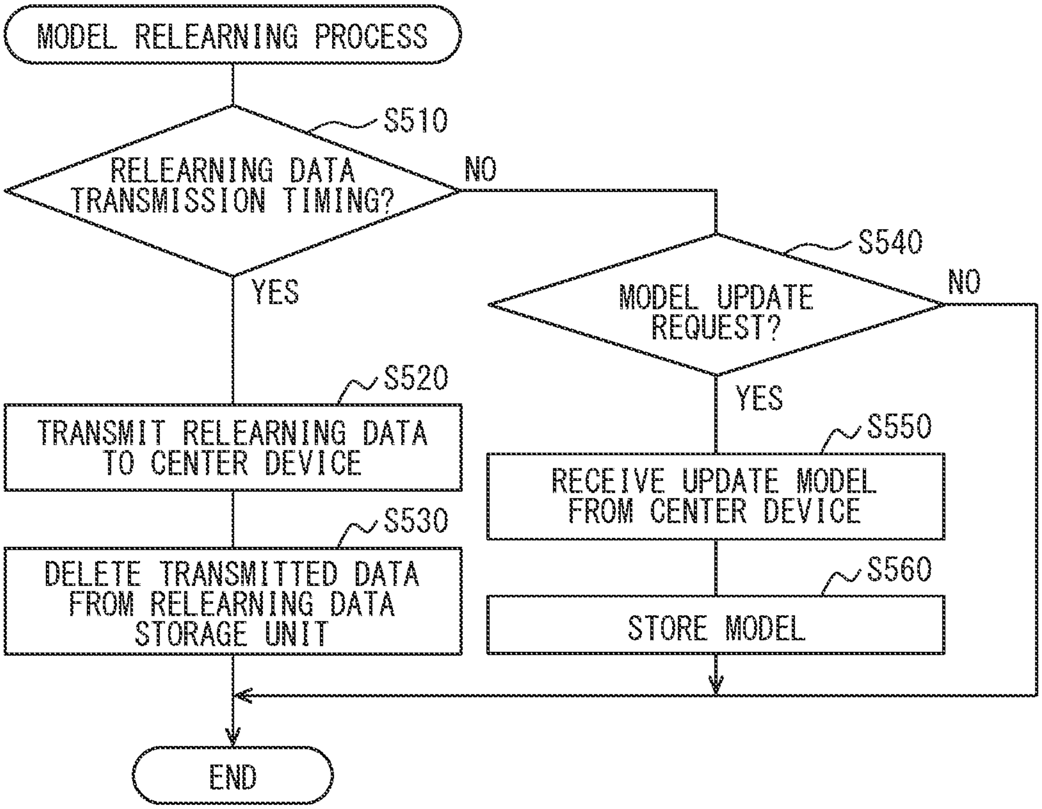
FIG. 10 is a flowchart showing a model relearning process.

The model relearning process executed by the processing unit 23 will be described with reference to the flowchart of FIG. 10. Similarly to the analysis process, the model relearning process is repeatedly executed at regular intervals when the edge device 2 is activated by, for example, turning on the ignition of the edge-equipped vehicle.

When the model relearning process is started, in S510, the processing unit 23 determines whether or not it is time to transmit the relearning data. When it is the transmission timing, the process proceeds to S520. When it is not the transmission timing, the process proceeds to S540. The transmission timing of the relearning data may be, for example, timing at regular intervals such as every week or every day. Alternatively, the transmission timing of the relearning data may be the timing when the relearning data stored in the transmission data storage unit 26 reaches a predetermined amount. Alternatively, the transmission timing of the relearning data may be the timing at which a relearning request is input from the driver.

In S520, the processing unit 23 transmits the relearning data stored in the learning data storage unit 27 to the center device 3 via the external communication unit 22.

In subsequent S530, the processing unit 23 deletes the transmitted relearning data from the learning data storage unit 27, and ends the process.

In S540, the processing unit 23 determines whether or not a model update request has been received from the center device 3 via the external communication unit 22. When the model update request has been received, the process proceeds to S550. When the model update request has not been received, the process ends.

In S550, the processing unit 23 receives from the center device 3 a new analysis model to be used for updating.

In subsequent S560, the processing unit 23 updates the analysis model stored in the model storage unit 24 with the received analysis model, and ends the process.

[3-4. Data Automatic Transmission Process]

Figure 11:
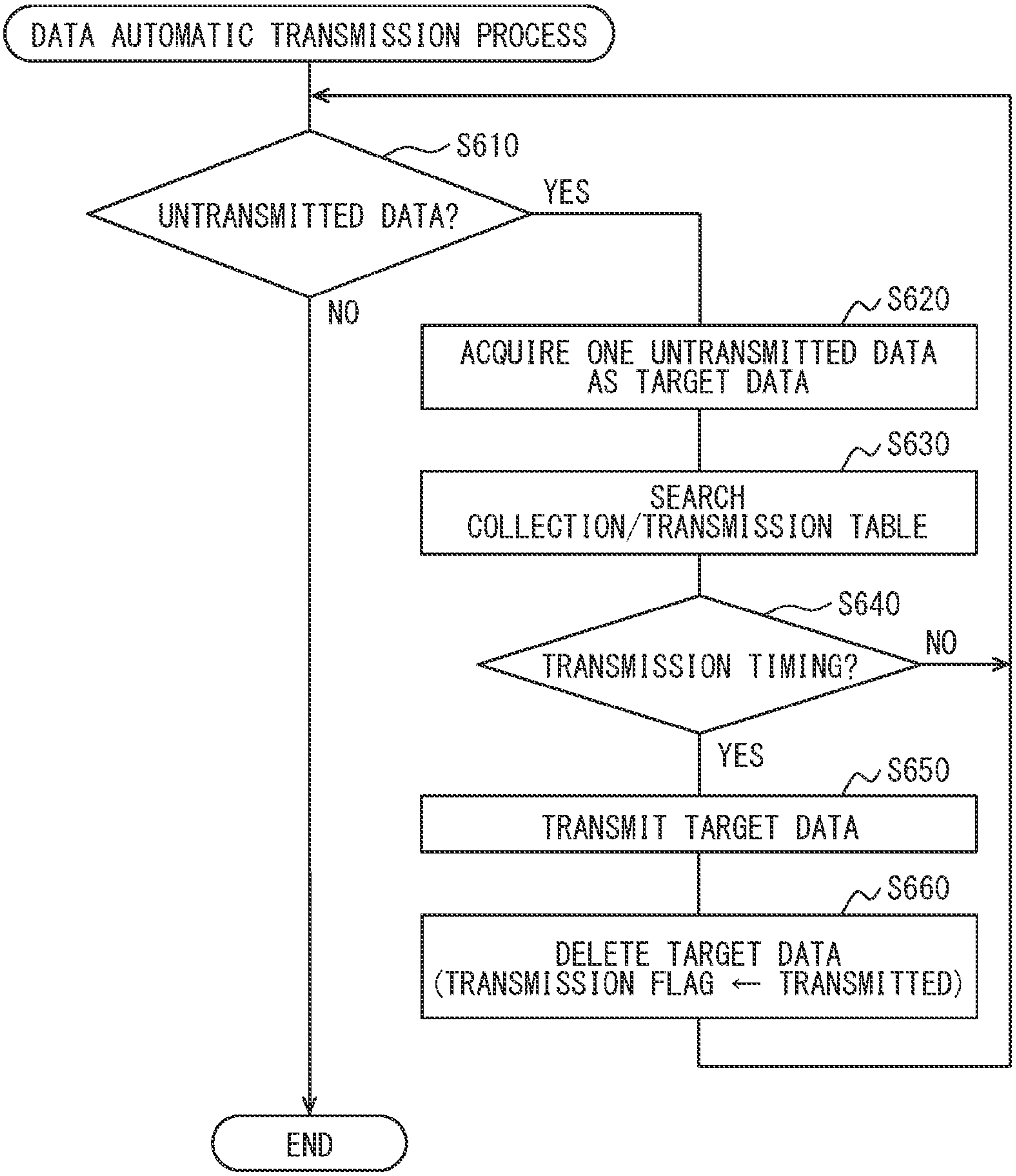
FIG. 11 is a flowchart showing an data automatic transmission process.

The data automatic transmission process executed by the processing unit 23 will be described with reference to the flowchart of FIG. 11. The data automatic transmission process is repeatedly executed at regular intervals when the edge device 2 is activated, for example, by turning on the ignition of the edge-equipped vehicle. This constant period may be the same as or different from that of the collection/analysis process described above.

When the data automatic transmission process is started, at S610, the processing unit 23 determines whether or not there is untransmitted selected data (hereinafter referred to as untransmitted data) in the transmission data storage unit 26. When there is the untransmitted data, the process proceeds to S720. When there is no untransmitted data, the process ends. Whether the data is untransmitted data or not is determined based on the vehicle data whose transmission flag is set to untransmitted.

In S620, the processing unit 23 acquires one of the untransmitted data as target data.

In subsequent S630, the processing unit 23 searches the collection/transmission table stored in the table storage unit 25 to acquire a collection frequency and a latest collection date and time of the target data.

In subsequent S640, the processing unit 23 determines whether or not it is time to transmit the target data based on the information acquired in S730. Specifically, with respect to the latest collection date and time as a base point, it is determined whether or not the timing corresponding to the collection frequency has passed.

When the processing unit 23 determines that it is the time to transmit the target data, the process proceeds to S650. When the processing unit 23 determines that it is not the time to transmit the target data, the process returns to S610.

In S650, the processing unit 23 transmits the target data to the center device 3 via the external communication unit 22.

In subsequent S660, the processing unit 23 sets the transmission flag of the target data from the transmission data storage unit 26 to "transmitted", and returns the process to S610. Note that the target data may be deleted from the transmission data storage unit 26 instead of setting the transmission flag of the target data to the "transmitted".

[3-5. Data Passive Transmission Process]

Figure 12:
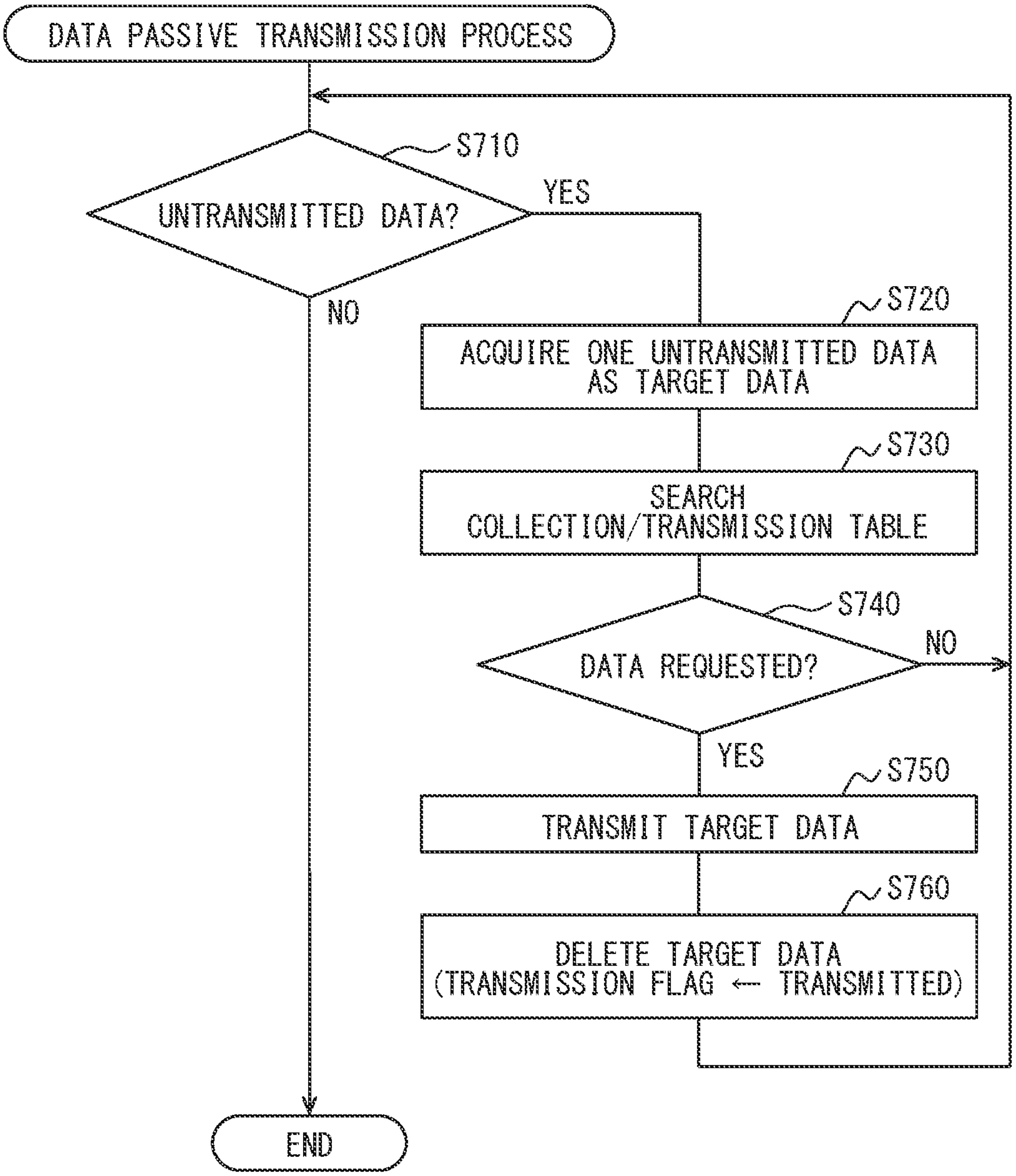
FIG. 12 is a flowchart showing a data passive transmission process.

The data passive transmission process executed by the processing unit 23 will be described with reference to the flowchart of FIG. 12. The data passive transmission process is started when a data transmission request is received from the center device 3 via the external communication unit 22.

When the data passive transmission process is started, the processing unit 23 executes the process of S710 to S730. Note that the process of S710 to S730 are similar to the process of S610 to S630 in the data automatic transmission process.

In subsequent S740, the processing unit 23 determines whether or not the target data is requested data indicated in the data transmission request. When the target data is the requested data, the process proceeds to S750. When the target data is not requested data, the process returns to S710. When the purpose of use is indicated in the data transmission request, all the vehicle data associated with the purpose of use in the collection/transmission table are the requested data. When data type is listed in the data transmission request, the vehicle data of the listed data type are the requested data.

In S750-S760, the processing unit 23 executes the process similar to those of S650-S660 in the data automatic transmission process.

4. Concept of Analysis Model

In the analysis model, assuming how a typical vehicle is used for the purpose of use, it is conceivable to discriminate the purpose of use depending on whether or not the discrimination data group indicates the content corresponding to the purpose of use of the vehicle.

When determining commercial use, the vehicle data belonging to the discrimination data group may include the on/off state of the ignition switch, the current position of the vehicle, the direction of the vehicle, the traveling speed of the vehicle, intermediate data computed from these data, and the like. Hereinafter, the ON state of the ignition switch is indicated by IG-ON, and the OFF state thereof is indicated by IG-OFF. In addition, the intermediate data may include an interval from IG-ON to IG-OFF (hereinafter referred to as IG-ON/OFF interval), and a velocity vector collectively representing the current position, the current direction, and the current travelling speed.

When determining the purpose of use for private use, the vehicle data belonging to the discrimination data group may include the ON/OFF state of the ignition switch, the current position, setting data prepared in advance, intermediate data computed from these data, and the like. The setting data may include a home location, a commuting/schooling destination, a commuting/schooling route from the home, and the like. The setting data may be entered by the user or estimated from the vehicle data. For example, a location where the vehicle is parked for a long time at night may be estimated to be the home location. Alternatively, a location where the vehicle is parked for a long time during the daytime may be estimated to be a location of the commuting/schooling destination, and a route connecting the location of the home with the location of the commuting/schooling destination may be estimated as a home-commuting/schooling route. The intermediate data may include a distance from the home, a date and time of IG-ON, a distance away from the home-commuting/schooling route, and the like.

When the purpose of use is long distance transportation, it is assumed that a truck is heavily loaded and moves on a highway between cities. In this case, when the IG-ON/OFF interval is long and when a length of the velocity vector is large with small change in the direction (i. e., moving in one direction over a long distance), it may be determined that the purpose of use is long distance transportation.

When the purpose of use is home delivery, it is assumed that a work of delivering packages to individual homes is repeated with a relatively short distance traveled by a vehicle. In this case, when the IG-ON/OFF interval is short and when the length of the velocity vector is large with large change in the direction, it may be determined that the purpose of use is home delivery.

When the purpose of use is a taxi, it is assumed that the taxi waits in front of a station, picks up a passenger, moves to a destination, and then returns to the station as a base point. In this case, when the IG-ON/OFF interval is long, when the length of the velocity vector is close to zero, and when the velocity vector in various directions starting from the base point and the velocity vector toward the base point are detected at a high frequency, the purpose of use may be determined to be the taxi. That is, the velocity vector whose length is close to zero indicates that the vehicle is waiting in an idling state. Velocity vectors in various directions starting from the base point represent that the vehicle carrying a passenger is moving from a front of a station to an arbitrary destination. The velocity vector toward the base point represents that the vehicle returns from the destination to the station.

When the purpose of use is the hired car, it is assumed that a VIP rents out the hired car, moves to various locations, and repeats a behavior of completing errands at locations. In this case, when the IG-ON/OFF interval is long, when the length of the velocity vector is large, and when the direction of the velocity vector is multidirectional, it may be determined that the purpose of use is the hired car.

When the characteristics of the IG-ON/OFF interval and the speed vector do not have the regularity as described above, it may be determined that the purpose of use is a rental car/shared car.

When the purpose of use is the commuting/schooling, it is assumed that the user moves from the home to work or school at the same time every day on weekdays. In this case, when the IG-ON is performed at the same point and at the same time on weekdays, and when a distance of the current position deviated from a home-commuting/schooling route is within an allowable range, the purpose of use may be determined to be the commuting/schooling.

When the purpose of use is leisure, it is assumed that the user moves from the home to various travel destinations on weekends and holidays. In this case, when the IG-ON is performed at the same location as the commuting/schooling on a day other than the commuting/schooling, and the vehicle travels on a route at a low driving frequency, or when the current position is far from the home, the purpose of use may be determined as the leisure.

When the purpose of use is shopping, it is assumed that the user travels to a supermarket every week, does the shopping, and then returns the home. In this case, when the IG-ON is performed on a holiday and when the current position is close to the home, the purpose of use may be determined as the shopping. Alternatively, when the IG-ON is performed on a weekday and when the current position is close to the home, but the distance from the home to the route of commuting/schooling is large, the purpose of use may be determined as the shopping.

Herein, the steady state of use assumes that the vehicle travels on a usual road as usual. The unsteady state of use assumes that a special event such as construction work or an accident occurs and the vehicle behaves differently from the normal (for example, travels on a detour).

Basically, the frequency of storing and transmission of data may be reduced for the purpose of use such as repeatedly traveling the same route. When the state of use is unsteady, it is an irregular state, and therefore, the frequency of storing and transmission of data may be increased. However, when many vehicles with the same purpose of use exist in the same area, there is no need to increase the frequency of storing and transmission of data even in the unsteady state.

A specific concept for setting the frequency of storing and transmission of data for each purpose of use are exemplified below.

When the purpose of use is long distance transportation, the same data may be collected at the same frequency regardless of whether the state of use is steady or unsteady. In other words, in inter-city transportation assumed in the long distance transportation, traveling route is limited to a highway and a main road. Therefore, there are many vehicles traveling between the same cities, and the vehicle data collected from these vehicles are redundant. In addition, even when a special event occurs and a detour is taken, many vehicles are likely to travel the same detour. Therefore, there is no need to change the type of data to be collected or the frequency of collection depending on whether the state of use is steady or unsteady, and the frequency of collecting vehicle data for each vehicle can be set low. It is noted that, the transmission timing of each vehicle may be set stochastically so that an amount of data received by the center device 3 is averaged regardless of time.

When the purpose of use is the home delivery, the same data may be collected at the same frequency regardless of whether the state of use is steady or unsteady. In other words, the vehicle used for the home delivery travels to every corner of a residential area along community roads, and therefore, it is worth to store and transmitting data at a high frequency. When a special event occurs, data that is rarer than normal data is collected. Therefore, although the frequency of storing and transmission of data can be increased, it is not necessary to decrease the frequency. In case of the home delivery, one IG-ON period is short, and it is difficult to transmit a large amount of data at once. Therefore, a small amount of data may be transmitted in pieces.

When the purpose of use is the taxi, as mentioned above, there is a tendency to repeat the behavior of moving radially around a specific point and returning to the specific point. Therefore, data close to the specific point are redundantly collected. Therefore, even when the state of use is the steady, as the position of the vehicle becomes closer to the specific point, the data to be stored and transmitted may be thinned out, and, as the distance from the specific point increases, the data may be stored and transmitted more frequently. In addition, when the state of use is unsteady, it is considered that the data should be shared with other vehicles promptly. Therefore, the collection frequency may be increased to be higher than the collection frequency in the steady state.

When the purpose of use is the hired car, the same route will not be taken for many times. Therefore, regardless of whether the state of use is steady or unsteady, data may be recorded and transmitted at high frequency. In addition, in the case of the hire car, one IG-ON period is not short. Therefore, dissimilarly to the home delivery, a small amount of data may not be transmitted piece by piece, and the stored data may be collectively transmitted later.

When the purpose of use is commuting/schooling, data for the same route is collected every day in a case where the state of use is steady. Therefore, for example, the data may be stored and transmitted only once a week. When the state of use is unsteady, data of a special event is valuable. Therefore, the data may not be thinned out and may be stored and transmitted.

When the purpose of use is the leisure, the same route will not be taken over and over again, similarly to the hired car. Therefore, regardless of whether the state of use is steady or unsteady, data may be recorded and transmitted at the same frequency. In addition, in a location near a tourist spot, which is a destination of travelling, similar data is stored and transmitted by many vehicles. Therefore, data to be collected and transmitted may be thinned out at a location closer to a tourist spot. In addition, similarly to the long distance transportation, a timing at which each vehicle transmits data may be set stochastically, such that an amount of data received by the center device 3 is averaged in a time series manner.

When the purpose of use is the shopping, similarly to the commuting/schooling, data for the same route is collected every time in a case where the state of use is steady. Therefore, the data may be thinned out, and the data may be stored and transmitted only once a week, for example. Similarly to the commuting/schooling, data for a special event is valuable when the state of use is unsteady. Therefore, the data may not be thinned out and may be stored and transmitted.

The shopping is movement from a residential area to a commercial area, and the commuting/schooling is movement from a residential area to an industrial area. Therefore, the data of both the shopping and the commuting/schooling will not be duplicated to each other, and there is sufficient value in collecting the data by distinguishing between the shopping and the commuting/schooling.

5. Correspondence of Terms

In this embodiment, the edge device 2 corresponds to a vehicle data collection device in the present disclosure, and the in-vehicle communication unit 21 corresponds to a data collector in the present disclosure. The driver recognition process corresponds to a driver recognizer in the present disclosure, and the collection/transmission table corresponds to a correspondence table in this disclosure. The process of S110 corresponds to a data accumulator in the present disclosure, the process of S150 corresponds to a purpose discriminator in the present disclosure, the process of S160 to S200 corresponds to a storage controller in the present disclosure, and the process of S210 corresponds to a model updater. The process of S510 to S560 corresponds to a model relearner in the present disclosure, the process of S610 to S660 corresponds to a transmission controller in the present disclosure, and the process of S710 to S760 corresponds to a passive transmission controller.

6. Effect

According to the embodiment described above, the following effects are achieved.

(A) The edge device 2 discriminates the purpose of use of the vehicle from the discrimination data group, which is multiple types of vehicle data collected in a certain period of time in the past, stores, in the transmission data storage unit 26, selectively the vehicle data necessary for the discriminated purpose of use, and transmits the data to the center device 3. Therefore, according to the edge device 2, the amount of the data to be transmitted to the center device 3 can be reduced, and therefore, necessary data can be efficiently transmitted. In addition, an amount of power consumed by the edge device 2 for transmission of the data is reduced. Therefore, it is possible to improve a fuel efficiency of the edge-equipped vehicle. Furthermore, both the edge device 2 and the center device 3 are enabled to reduce a capacity of the memory for holding the data to be transmitted and received and to reduce a cost for holding the data. For example, in a case of a vehicle used for the commuting/schooling, by simply thinning out the data collection in the commuting/schooling once a week, the amount of data can be reduced by 24%.

(B) The edge device 2 repeatedly discriminates the purpose of use of the vehicle. Therefore, even when the purpose of use of the vehicle is changed, it is possible to continue the storage and transmission of the vehicle data adapted to the changed purpose of use.

(C) The edge device 2 compares the data cluster formed of the discrimination data group with multiple model clusters belonging to the analysis model, thereby to discriminate the purpose of use of the vehicle. When the discrimination data group does not form a cluster, the edge device 2 removes the discrimination data group as a noise. Therefore, it is possible to improve the accuracy of discrimination of the purpose of use using the analysis model.

(D) As the analysis model, the dedicated analysis model adjusted for each driver and the general analysis model that does not depend on the driver are prepared. When the driver is recognized, the dedicated analysis model is used. Therefore, even when the driver has an intense driving habit, the purpose of use of the vehicle can be discriminated with high accuracy by using the dedicated analysis model.

(E) When the purpose of use of the vehicle is successfully discriminated, the edge device 2 recomputes the range of the model cluster corresponding to the discriminated purpose of use in the analysis model using the discrimination data group used for the discrimination, thereby to finely adjust the analysis model. Therefore, it is possible to suppress deterioration in the accuracy of discrimination of the analysis model due to aging of the vehicle characteristics, change in a driving technique of the driver, and the like.

(F) When the discrimination data group forms the data cluster, the edge device 2 accumulates, regardless of the discrimination result of the purpose of use, all the discrimination data group as learning data, and transmits all the discrimination data group to the center device 3 at a relearning timing. Further, the edge device 2 acquires, from the center device 3, the analysis model, which is relearned using the learning data, and updates the content stored in the model storage unit 24 with the acquired analysis model. For example, when a rate of failure in discrimination of the purpose of use using the analysis model increases, relearning is performed. In this way, it is possible to suppress deterioration of the accuracy of determination of the purpose of use from exceeding an allowable range.

(G) In response to the request from the center device 3, the edge device 2 searches the transmission data storage unit 26 for untransmitted data that matches the request, and transmits the data to the center device 3. Therefore, the edge device 2 enables to provide data in response to the request from the center device 3. Further, the center device 3 enables to collect necessary data at an optional timing.

7. Other Embodiments

Although the embodiments of the present disclosure have been described above, the present disclosure is not limited to the embodiments described above, and various modifications can be made to implement the present disclosure.

(a) In the present disclosure, both storage and transmission of the selected data are performed according to the collection frequency of the collection/transmission table. It is noted that, the collection frequency may be set separately for the storage frequency and the transmission frequency. In this case, for example, the selected data for a certain period of time may be stored in the transmission data storage unit 26 at the set storage frequency, and a time series of selected data stored in the certain period may be transmitted to the center device 3 at the set transmission frequency. Further, in a case where the selected data stored in the transmission data storage unit 26 is overwritten and updated at the set storage frequency, and where the selected data is transmitted to the center device 3 at the set transmission frequency, the latest selected data stored in the transmission data storage unit 26 may be selectively transmitted.

(b) In the present disclosure, the collection frequency is changed depending on whether the state of use discriminated using the analysis model is steady or unsteady. It is noted that, instead of the collection frequency, or in addition to the collection frequency, the type and the number of the vehicle data included in the selected data may be changed.

(c) In this present disclosure, the automatic transmission of the selected data according to the collection frequency set in the collection/transmission table and the passive transmission in response to the request from the center device 3 are performed. In addition to these transmissions, when a specific application running on the edge-equipped vehicle requests transmission of the data to the center device 3, necessary data may be extracted from the transmission data storage unit 26 and may be transmitted. In this case, in addition to the selected data corresponding to the purpose of use, selected data corresponding to the application that is running may be stored in the transmission data storage unit 26.

(d) The processing unit 23 and the method thereof described in the present disclosure may be implemented by a dedicated computer that is provided by configuring a processor and memory programmed to execute one or more functions embodied by a computer program. Alternatively, the processing unit 23 and the method thereof described in the present disclosure may be implemented by a dedicated computer including a processor with one or more dedicated hardware logic circuits. Alternatively, the processing unit 23 and the method described in the present disclosure may be realized by one or more dedicated computer, which is configured as a combination of a processor and a memory, which are programmed to execute one or more functions, and a processor which is configured with one or more hardware logic circuits. The computer program may be stored in a computer-readable non-transitory tangible recording medium as an instruction executed by a computer. The configuration for implementing the functions of each unit included in the processing unit 23 does not necessarily need to include software, and all the functions may be implemented using one or more hardware circuits.

(e) A plurality of functions of one element in the above embodiment may be implemented by a plurality of elements, or one function of one element may be implemented by a plurality of elements. In addition, multiple functions of multiple components may be realized by one component, or a single function realized by multiple components may be realized by one component. A part of the configuration of the above embodiment may be omitted. At least a part of the configuration of the above embodiments may be added to or replaced with another configuration of the above embodiments.

(f) In addition to the vehicle data collection device corresponding to the edge device as described above, a system having the vehicle data collection device as a component, a program for making the computer function as the vehicle data collection device, a non-transitory tangible storage medium such as a semiconductor memory in which the program is stored, and a vehicle data collection method may be provided in various forms to realize the present disclosure.

What is claimed is:

1. A vehicle data collection device comprising:

an in-vehicle communication unit configured to collect vehicle data from at least one in-vehicle device of a vehicle during operation of the vehicle, the at least one in-vehicle device including at least one sensor and at least one electronic control unit, the at least one sensor including at least one camera, and the vehicle data including information indicating an operation of the vehicle by a driver of the vehicle, information, which is a velocity vector of the vehicle, representing a behavior of the vehicle, an operating status of the at least one in-vehicle device, and image information from the at least one camera including at least one first image of an inside of the vehicle and at least one second image of an outside of the vehicle;

a model storage unit with memory configured to store an analysis model representing a plurality of correspondences between a plurality of tendencies, which are shown by a time series of the collected vehicle data, and a plurality of purposes of use each representing a purpose for which the driver of the vehicle is using the vehicle, each tendency of the plurality of tendencies being associated in the analysis model with an associated purpose of the plurality of purposes of use, and the plurality of purposes of use including: a cargo transportation use, including a long distance transportation use and a home delivery use; a passenger transportation use including a taxi use and a hired car use; a rental car/share car use; a commuting/schooling use, a leisure use, and a shopping use;

a table storage unit with memory configured to store a correspondence table indicating particular vehicle data to be collected and a particular transmission frequency for each of the plurality of purposes of use;

a transmission data storage unit with memory configured to store the particular vehicle data to be transmitted to a center device configured to accumulate data; and a processor and memory configured to:

accumulate and store the vehicle data collected by the in-vehicle communication unit over a predetermined period of time;

determine a particular tendency indicated by at least a subset of the vehicle data collected over the predetermined period of time;

classify a particular use of the vehicle during the predetermined period as one of the plurality of purposes of use based on the determined tendency and the analysis model stored in the memory of the model storage unit;

determine whether the particular use of the vehicle has been successfully classified;

in response to determining that the particular use of the vehicle has been successfully classified, store, in the memory of the transmission data storage unit, the particular vehicle data to be collected based on the determined particular use of the vehicle, based on the correspondence table and the particular use of the vehicle; and perform wireless communications with the center device to transmit the collected particular vehicle data, stored in the memory of the transmission data storage unit, to the center device at the particular transmission frequency corresponding to the particular use;

wherein the plurality of correspondences of the analysis model includes the following associations between the plurality of tendencies and the plurality of purposes of use:

the long distance transportation use associated with a first tendency of: a time of ON of an ignition switch of the vehicle is greater than an ignition time threshold, a length of the velocity vector is greater than a length threshold, and an amount of change in a direction of the velocity vector is less than a direction change threshold;

the home delivery use associated with a second tendency of: the time of ON of the ignition switch is less than the ignition time threshold, the length of the velocity vector is greater than the length threshold and the amount of change in direction of the velocity vector is larger than the direction change threshold;

the taxi use associated with a third tendency of: the time of ON of the ignition switch is greater than the ignition time threshold, the length of the velocity vector is zero followed by the direction the velocity vector moving in a first plurality of directions from a base point followed by the direction of the velocity vector returning towards the base point;

the hired car use associated with a fourth tendency of: the time of ON of the ignition switch is greater than the ignition time threshold, the length of the velocity vector is greater than the length threshold, and the direction the velocity vector moving in a second plurality of directions;

the rental car/share car use associated with a fifth tendency of: an interval of the time of ON of the ignition switch followed by a time of OFF of the ignition is irregular and the velocity vector is irregular;

the commuting/schooling use associated with a sixth tendency of: the ignition switch turning to ON is performed at a same location and at a same time on weekdays and a deviation of a distance of a current position of the vehicle to a commuting/schooling route is within a predetermined range;

the leisure use associated with a seventh tendency of: the ignition switch turning to ON is performed at the same location as the sixth tendency on weekend days and either a route of the vehicle is traveled at a frequency less than a low driving frequency, or a current position of the vehicle is greater than a first distance threshold from a home associated with the vehicle; and the shopping use associated with an eighth tendency of: (i) the ignition switch turning to ON is performed on a holiday and a current position of the vehicle is less than the predetermined distance threshold from the home associated with the vehicle; or (ii) the ignition switch turning to ON is performed on a weekday, the current position of the vehicle is less than the predetermined distance threshold from the home associated with the vehicle, and the distance from the home associated with the vehicle to the commuting/schooling route is greater than a second distance threshold.

2. The vehicle data collection device according to claim 1, wherein in the correspondence table, the particular vehicle data to be collected is associated with a collection frequency, the processor and memory are further configured to perform at least one of storing of the particular vehicle data in the memory of the transmission data storage unit or transmission of the particular vehicle data stored in the memory of the transmission data storage unit, according to the collection frequency, which is identified using the correspondence table and based on the particular use of the vehicle.

3. The vehicle data collection device according to claim 1, wherein the processor and memory are further configured to:

transmit the particular vehicle data stored in the memory of the transmission data storage unit, in response to a request from the center device.

4. The vehicle data collection device according to claim 1, wherein the processor and memory are further configured to:

recognize a driver of the vehicle, and wherein the analysis model is prepared for each driver to be recognized by the processor and memory, and the processor and memory are further configured to switch the analysis model to be used according to a result of recognizing the driver.

5. The vehicle data collection device according to claim 1, wherein the analysis model is generated by clustering the vehicle data previously acquired, a cluster associated with the particular use included in the analysis model is a model cluster, and the processor and memory are further configured to determine that the particular purpose has been successfully classified when the cluster is associated with the model cluster.

6. The vehicle data collection device according to claim 5, wherein the processor and memory are further configured to:

determine that the particular use of the vehicle has been successfully classified when a position of the cluster is within a predetermined range of the model cluster, on determination that the particular use of the vehicle has been successfully classified, determine that a state of use of the particular use is steady, when the position of the cluster is inside the model cluster, and determine that the state of use is unsteady, when the position of the data cluster is outside the model cluster, and change at least one of the collected particular data or a collection frequency according to whether the state of use is the steady or the unsteady.

7. The vehicle data collection device according to claim 5, wherein the processor and memory are further configured to:

finely adjust a range of the model cluster, which corresponds to the particular use in response to determining that the particular use of the vehicle has been successfully classified.

8. The vehicle data collection device according to claim 7, wherein the processor and memory are further configured to:

when the particular use of the vehicle has not been successfully classified, set a mode of failure to delete, and when the mode of failure is set to delete, delete, as a noise, a data group, of which the particular use of the vehicle has not been successfully classified.

9. The vehicle data collection device according to claim 7, wherein the processor and memory are further configured to:

when the data cluster is not associated with the model cluster, determine that the particular purpose has not been successfully classified, and set a mode of failure to relearn, and when the mode of failure is set to relearn, store, as relearning data used for relearning of the analysis model in a memory of a learning data storage unit.

10. The vehicle data collection device according to claim 9, wherein the processor and memory are further configured to:

relearn the analysis model based on the relearning data stored in the memory of the learning data storage unit.

11. The vehicle data collection device according to claim 10, wherein the processor and memory are further configured to:

transmit the relearning data to the center device, receive the analysis model, which is relearned using the relearning data, from the center device, and update a content, which is stored in the memory of the model storage unit, with the received analysis model.

12. The vehicle data collection device according to claim 1, wherein the processor and memory are further configured to:

extract, among the accumulated vehicle data, the particular vehicle data corresponding to the particular use that is determined to be successfully classified; and transmit, among the vehicle data, only the particular vehicle data to the center device.

13. A vehicle data collection system comprising:

a vehicle data collection device mounted on a vehicle; and a center device configured to communicate with the vehicle data collection device, wherein the vehicle data collection device includes:

an in-vehicle communication unit configured to collect vehicle data from at least one in-vehicle device of a vehicle during operation of the vehicle, the at least one in-vehicle device including at least one sensor and at least one electronic control unit, the at least one sensor including at least one camera, and the vehicle data including information indicating an operation of the vehicle by a driver of the vehicle, information, which is a velocity vector of the vehicle, representing a behavior of the vehicle, an operating status of the at least one in-vehicle device, and image information from the at least one camera including at least one first image of an inside of the vehicle and at least one second image of an outside of the vehicle;

a model storage unit with memory configured to store an analysis model representing a plurality of correspondences between plurality of tendencies, which are shown by a time series of the collected vehicle data, and a plurality of purposes of use each representing a purpose for which the driver of the vehicle is using the vehicle, each tendency of the plurality of tendencies being associated in the analysis model with an associated purpose of the plurality of purposes of use, and the plurality of purposes of use including: a cargo transportation use, including a long distance transportation use and a home delivery use; a passenger transportation use including a taxi use and a hired car use; a rental car/share car use; a commuting/schooling use, a leisure use, and a shopping use;

a table storage unit with memory configured to store a correspondence table indicating particular vehicle data to be collected and a particular transmission frequency for each of the plurality of purposes of use;

a transmission data storage unit with memory configured to store the particular vehicle data to be transmitted to the center device;

a processor and memory configured to:

accumulate and store the vehicle data collected by the in-vehicle communication unit over a predetermined period of time;

determine a particular tendency indicated by at least a subset of the vehicle data collected over the predetermined period of time;

classify a particular use of the vehicle during the predetermined period as one of the plurality of purposes of use based on the determined tendency and the analysis model stored in the memory of the model storage unit;

determine whether the particular use of the vehicle has been successfully classified;

vehicle has been successfully classified, store, in the memory of the transmission data storage unit, the particular vehicle data to be collected based on the determined particular use of the vehicle, based on the correspondence table and the particular use of the vehicle; and perform wireless communications with the center device to transmit the collected particular vehicle data, stored in the memory of the transmission data storage unit, to the center device at the particular transmission frequency, wherein the center device is configured to accumulate the particular vehicle data, which is transmitted from the vehicle data collection device, for analysis or for providing a mobility service;

wherein the plurality of correspondences of the analysis model includes the following associations between the plurality of tendencies and the plurality of purposes of use:

the long distance transportation use associated with a first tendency of: a time of ON of an ignition switch of the vehicle is greater than an ignition time threshold, a length of the velocity vector is greater than a length threshold, and an amount of change in a direction of the velocity vector is less than a direction change threshold;

the home delivery use associated with a second tendency of: the time of ON of the ignition switch is less than the ignition time threshold, the length of the velocity vector is greater than the length threshold and the amount of change in direction of the velocity vector is larger than the direction change threshold;

the taxi use associated with a third tendency of: the time of ON of the ignition switch is greater than the ignition time threshold, the length of the velocity vector is zero followed by the direction the velocity vector moving in a first plurality of directions from a base point followed by the direction of the velocity vector returning towards the base point;

the hired car use associated with a fourth tendency of: the time of ON of the ignition switch is greater than the ignition time threshold, the length of the velocity vector is greater than the length threshold, and the direction the velocity vector moving in a second plurality of directions;

the rental car/share car use associated with a fifth tendency of: an interval of the time of ON of the ignition switch followed by a time of OFF of the ignition is irregular and the velocity vector is irregular;

the commuting/schooling use associated with a sixth tendency of: the ignition switch turning to ON is performed at a same location and at a same time on weekdays and a deviation of a distance of a current position of the vehicle to a commuting/schooling route is within a predetermined range;

the leisure use associated with a seventh tendency of: the ignition switch turning to ON is performed at the same location as the sixth tendency on weekend days and either a route of the vehicle is traveled at a frequency less than a low driving frequency, or a current position of the vehicle is greater than a first distance threshold from a home associated with the vehicle; and the shopping use associated with an eighth tendency of: (i) the ignition switch turning to ON is performed on a holiday and a current position of the vehicle is less than the predetermined distance threshold from the home associated with the vehicle; or (ii) the ignition switch turning to ON is performed on a weekday, the current position of the vehicle is less than the predetermined distance threshold from the home associated with the vehicle, and the distance from the home associated with the vehicle to the commuting/schooling route is greater than a second distance threshold.

14. A vehicle data collection method comprising:

collecting vehicle data from at least one in-vehicle device of a vehicle during operation of the vehicle, the at least one in-vehicle device including at least one sensor and at least one electronic control unit, the at least one sensor including at least one camera, and the vehicle data including information indicating an operation of the vehicle by a driver of the vehicle, information, which is a velocity vector of the vehicle, representing a behavior of the vehicle, an operating status of the at least one in-vehicle device, and image information from the at least one camera including at least one first image of an inside of the vehicle and at least one second image of an outside of the vehicle;

determining a particular tendency indicated by at least a subset of the vehicle data collected over a predetermined period of time;

classifying a particular use of the vehicle during the predetermined period as one of a plurality of purposes of us based on the determined tendency and an analysis model, the analysis model representing a plurality of correspondences between a plurality of tendencies, which are shown by a time series of the collected vehicle data, and the plurality of purposes of use, the plurality of purposes of use each representing a purpose for which the driver of the vehicle is using the vehicle, each tendency of the plurality of tendencies being associated in the analysis model with an associated purpose of the plurality of purposes of use, and the plurality of purposes of use including: a cargo transportation use, including a long distance transportation use and a home delivery use; a passenger transportation use including a taxi use and a hired car use; a rental car/share car use; a commuting/schooling use, a leisure use, and a shopping use;

determining whether the particular use of the vehicle has been successfully classified;

in response to determining that the particular use of the vehicle has been successfully classified, storing particular vehicle data, which is a part of the vehicle data to be collected, using a correspondence table indicating particular vehicle data to be collected and a particular transmission frequency for each of the plurality of purposes of use; and performing wireless communications with a center device to transmit the stored particular vehicle data to the center device, which is configured to accumulate the particular vehicle data, at a set collection frequency;

wherein the plurality of correspondences of the analysis model includes the following associations between the plurality of tendencies and the plurality of purposes of use:

the long distance transportation use associated with a first tendency of: a time of ON of an ignition switch of the vehicle is greater than an ignition time threshold, a length of the velocity vector is greater than a length threshold, and an amount of change in a direction of the velocity vector is less than a direction change threshold;

the home delivery use associated with a second tendency of: the time of ON of the ignition switch is less than the ignition time threshold, the length of the velocity vector is greater than the length threshold and the amount of change in direction of the velocity vector is larger than the direction change threshold;

the taxi use associated with a third tendency of: the time of ON of the ignition switch is greater than the ignition time threshold, the length of the velocity vector is zero followed by the direction the velocity vector moving in a first plurality of directions from a base point followed by the direction of the velocity vector returning towards the base point;

the hired car use associated with a fourth tendency of: the time of ON of the ignition switch is greater than the ignition time threshold, the length of the velocity vector is greater than the length threshold, and the direction the velocity vector moving in a second plurality of directions;

the rental car/share car use associated with a fifth tendency of: an interval of the time of ON of the ignition switch followed by a time of OFF of the ignition is irregular and the velocity vector is irregular;

the commuting/schooling use associated with a sixth tendency of: the ignition switch turning to ON is performed at a same location and at a same time on weekdays and a deviation of a distance of a current position of the vehicle to a commuting/schooling route is within a predetermined range;

the leisure use associated with a seventh tendency of: the ignition switch turning to ON is performed at the same location as the sixth tendency on weekend days and either a route of the vehicle is traveled at a frequency less than a low driving frequency, or a current position of the vehicle is greater than a first distance threshold from a home associated with the vehicle; and the shopping use associated with an eighth tendency of: (i) the ignition switch turning to ON is performed on a holiday and a current position of the vehicle is less than the predetermined distance threshold from the home associated with the vehicle; or (ii) the ignition switch turning to ON is performed on a weekday, the current position of the vehicle is less than the predetermined distance threshold from the home associated with the vehicle, and the distance from the home associated with the vehicle to the commuting/schooling route is greater than a second distance threshold.

15. A vehicle data collection device comprising:

a processor;

a non-transitory computer-readable storage medium; and a set of computer-executable instructions stored on the non-transitory computer-readable storage medium to cause the processor to:

collect vehicle data from at least one in-vehicle device of a vehicle during operation of the vehicle, the at least one in-vehicle device including at least one sensor and at least one electronic control unit, the at least one sensor including at least one camera, and the vehicle data including information indicating an operation of the vehicle by a driver of the vehicle, information, which is a velocity vector of the vehicle, representing a behavior of the vehicle, an operating status of the at least one in-vehicle device, and image information from the at least one camera including at least one first image of an inside of the vehicle and at least one second image of an outside of the vehicle;

store an analysis model representing a plurality of correspondences between a plurality of tendencies, which are shown by a time series of the collected vehicle data, and a plurality of purposes of use each representing a purpose for which the driver of the vehicle is using uses the vehicle, each tendency of the plurality of tendencies being associated in the analysis model with an associated purpose of the plurality of purposes of use, and the plurality of purposes of use including: a cargo transportation use, including a long distance transportation use and a home delivery use; a passenger transportation use including a taxi use and a hired car use; a rental car/share car use; a commuting/schooling use, a leisure use, and a shopping use;

store a correspondence table indicating particular vehicle data to be collected and a particular transmission frequency for each of the plurality of purposes of use;

store the particular vehicle data to be transmitted to a center device configured to accumulate data;

accumulate and store the vehicle data collected over a predetermined period of time;

determine a particular tendency indicated by at least a subset of the vehicle data collected over the predetermined period of time;

classify a particular use of the vehicle during the predetermined period as one of the plurality of purposes of use based on the determined tendency and the analysis model;

determine whether the particular use of the vehicle has been successfully classified;

in response to determining that the particular use of the vehicle has been successfully classified, store the particular vehicle data to be collected based on the determined particular use of the vehicle, based on the correspondence table and the particular purpose of use of the vehicle; and perform wireless communications with the center device to transmit the collected particular vehicle data, to the center device at the particular transmission frequency corresponding to the particular use.

* * * * *